United States Patent
Herve et al.

(10) Patent No.: US 11,273,681 B2
(45) Date of Patent: Mar. 15, 2022

(54) SUSPENSION SYSTEM OF A VEHICLE AXLE

(71) Applicant: Volvo Truck Corporation, Gothenburg (SE)

(72) Inventors: Michel Herve, Lyons (FR); Stéphane Brun, Montceau les Mines (FR)

(73) Assignee: Volvo Truck Corporation, Gothenburg (SE)

( * ) Notice: Subject to any disclaimer, the term of this patent is extended or adjusted under 35 U.S.C. 154(b) by 434 days.

(21) Appl. No.: 16/490,104

(22) PCT Filed: May 15, 2017

(86) PCT No.: PCT/IB2017/000803
§ 371 (c)(1),
(2) Date: Aug. 30, 2019

(87) PCT Pub. No.: WO2018/211302
PCT Pub. Date: Nov. 22, 2018

(65) Prior Publication Data
US 2020/0070609 A1    Mar. 5, 2020

(51) Int. Cl.
*B60G 11/38* (2006.01)
*B60G 11/107* (2006.01)
(Continued)

(52) U.S. Cl.
CPC .............. *B60G 11/107* (2013.01); *B60G 1/04* (2013.01); *B60G 11/04* (2013.01); *B62D 21/155* (2013.01); *B60G 2204/121* (2013.01)

(58) Field of Classification Search
CPC .......... F16F 1/26; B60G 11/04; B60G 11/107; B60G 2202/112; B60G 2204/121
(Continued)

(56) References Cited

U.S. PATENT DOCUMENTS 2,776,135 A     1/1957   Assmus
3,591,197 A  *  7/1971   Haley .................... B60G 5/047
                                                       280/682
(Continued)

FOREIGN PATENT DOCUMENTS

WO         9907593  A1     2/1999

OTHER PUBLICATIONS

International Search Report and Written Opinion for International Patent Application No. PCT/IB2017/000803, dated Feb. 7, 2018, 10 pages.

*Primary Examiner* — Toan C To
(74) *Attorney, Agent, or Firm* — Withrow & Terranova, PLLC

(57) ABSTRACT

The invention relates to a suspension system of a vehicle axle, comprising:—a leaf spring (11);—a rear attachment device which is configured to be secured to a vehicle frame (2) and which receives a rear end portion (14) of the leaf spring (11) so as to allow said leaf spring rear end portion to slide longitudinally relative to the rear attachment device; wherein:—the rear attachment device (24) comprises a fastener (26) extending substantially transversally and a pad (28) secured on the rear attachment device above the fastener;—the leaf spring rear end portion (14) is substantially flat and has an upper face (15) in contact with the pad (28) and a lower face (16);—and the suspension system further comprises a retaining member (30) which is a piece separate from the leaf spring (11). The retaining member (30) is secured to and under the leaf spring rear end portion (14) by a fixing element (50) located rearward of the pad (28), the retaining member (30) including a front wall (33) arranged forward of the fastener (26), and configured to abut against the fastener (26) in order to prevent a rearward movement of (Continued)

the leaf spring (11) relative to the rear attachment device (24) above a predetermined limit.

9 Claims, 2 Drawing Sheets

(51) Int. Cl.
*B60G 1/04* (2006.01)
*B60G 11/04* (2006.01)
*B62D 21/15* (2006.01)

(58) Field of Classification Search
USPC .................................................. 280/124.163
See application file for complete search history.

(56) References Cited

U.S. PATENT DOCUMENTS

| | | | | |
|---|---|---|---|---|
| 3,850,445 A * | 11/1974 | Borns | ................... | B60G 21/055 |
| | | | | 280/124.163 |
| 4,061,363 A * | 12/1977 | Symons | ................... | B60G 3/06 |
| | | | | 280/124.111 |
| 4,412,690 A * | 11/1983 | Prokop | ................... | B60G 5/047 |
| | | | | 267/262 |
| 4,598,930 A * | 7/1986 | Smith | ................... | B60G 11/465 |
| | | | | 280/124.163 |
| 4,687,224 A * | 8/1987 | Selzer | ................... | B60G 11/04 |
| | | | | 267/36.1 |
| 5,114,125 A * | 5/1992 | Srch | ................... | B60G 9/00 |
| | | | | 267/265 |
| 5,219,151 A * | 6/1993 | Stewart | ................... | B60G 5/047 |
| | | | | 267/262 |
| 5,234,067 A * | 8/1993 | Simard | ................... | B60G 11/04 |
| | | | | 180/24.01 |
| 5,335,934 A * | 8/1994 | Hiller | ................... | B60G 11/107 |
| | | | | 267/260 |
| 5,636,857 A * | 6/1997 | Tandy, Jr | ................... | B60G 9/00 |
| | | | | 267/31 |
| 5,683,076 A * | 11/1997 | Ingvarsson | ................... | F16F 1/185 |
| | | | | 267/47 |
| 6,019,384 A * | 2/2000 | Finck | ................... | B60G 11/125 |
| | | | | 267/260 |
| 7,651,107 B1 * | 1/2010 | Chapin | ................... | F16F 1/30 |
| | | | | 280/124.165 |
| 8,191,873 B2 * | 6/2012 | Glass | ................... | F16F 1/26 |
| | | | | 267/47 |
| 10,549,594 B2 * | 2/2020 | Chihara | ................... | F16F 1/18 |
| 11,148,494 B2 * | 10/2021 | Herve | ................... | B60G 11/107 |
| 2007/0145706 A1 * | 6/2007 | Penzotti | ................... | B60G 17/023 |
| | | | | 280/124.174 |
| 2008/0048408 A1 * | 2/2008 | Reineck | ................... | B60G 11/04 |
| | | | | 280/124.104 |
| 2009/0115157 A1 * | 5/2009 | Platner | ................... | F16F 1/3686 |
| | | | | 280/124.176 |
| 2009/0302513 A1 * | 12/2009 | Enomoto | ................... | B60G 11/04 |
| | | | | 267/39 |
| 2010/0038877 A1 * | 2/2010 | Cortez | ................... | B60G 11/465 |
| | | | | 280/124.175 |
| 2011/0068524 A1 * | 3/2011 | McCarthy | ................... | B60G 11/12 |
| | | | | 267/265 |
| 2012/0043707 A1 * | 2/2012 | Akeda | ................... | B60G 11/04 |
| | | | | 267/51 |
| 2012/0153589 A1 * | 6/2012 | McCarthy | ................... | B60G 11/10 |
| | | | | 280/86.75 |
| 2013/0193663 A1 * | 8/2013 | Brun | ................... | B60G 7/02 |
| | | | | 280/124.128 |
| 2014/0117639 A1 * | 5/2014 | Ramsey | ................... | B60G 9/04 |
| | | | | 280/124.11 |
| 2014/0312543 A1 * | 10/2014 | Nakagawa | ................... | F16F 1/20 |
| | | | | 267/158 |
| 2015/0145187 A1 * | 5/2015 | Soles | ................... | B60G 11/42 |
| | | | | 267/30 |
| 2015/0273941 A1 * | 10/2015 | Mater, Jr. | ................... | B60B 35/007 |
| | | | | 280/86.75 |
| 2016/0159182 A1 * | 6/2016 | Cerri, III | ................... | F16C 17/02 |
| | | | | 403/380 |
| 2017/0313149 A1 * | 11/2017 | Chihara | ................... | B60G 11/107 |
| 2020/0001675 A1 * | 1/2020 | Herve | ................... | B60G 11/107 |
| 2020/0070609 A1 * | 3/2020 | Herve | ................... | F16F 1/26 |

* cited by examiner

SUSPENSION SYSTEM OF A VEHICLE AXLE

This application is a 35 USC 371 national phase filing of International Application No. PCT/IB2017/000803, filed May 15, 2017, the disclosure of which is incorporated herein by reference in its entirety.

TECHNICAL FIELD

The invention relates to a suspension system of a vehicle axle.

The invention can be applied in heavy-duty vehicles, such as trucks, buses and construction equipment, but is not restricted to these vehicles.

BACKGROUND

A conventional suspension for a vehicle includes a leaf spring, made of one leaf or several superimposed leaves, which is arranged longitudinally adjacent and under a frame girder of the vehicle.

There are provided a front attachment device and a rear attachment device, both secured to the vehicle frame. The leaf spring front end portion is engaged in the front attachment device, generally with no degree of freedom along the longitudinal direction, while the leaf spring rear end portion is engaged in the rear attachment device so as to be able to slide longitudinally relative to the rear attachment device. Furthermore, the leaf spring comprises an intermediate portion engaged in an intermediate attachment device for attaching the vehicle axle to the vehicle frame.

For weight and cost reasons, single leaf springs made of a single leaf are more advantageous than those comprising several leaves. However, in the event of a leaf spring break, no leaf remains to ensure the vehicle safety.

More specifically, if the leaf spring breaks at its front portion, it is no more maintained in the longitudinal direction. As a result, the vehicle axle connected to the suspension system is not maintained either in the longitudinal direction, which poses serious problems in terms of safety.

Therefore, there is a need for an improved suspension system of a vehicle axle.

SUMMARY

An object of the invention is to provide a suspension system of a vehicle axle which is improved in terms of safety, and especially which ensures the vehicle can be at least stopped safely in case the leaf spring has been broken.

To that end, according to a first aspect, the invention concerns a suspension system of a vehicle axle comprising a leaf spring having a longitudinal axis and a transverse axis, the suspension system comprising a rear attachment device which is configured to be secured to a vehicle frame and which receives a rear end portion of the leaf spring so as to allow said leaf spring rear end portion to slide longitudinally relative to the rear attachment device, wherein:

the rear attachment device comprises a fastener extending substantially transversally and a pad secured on the rear attachment device above the fastener;

the leaf spring rear end portion is substantially flat and has an upper face in contact with the pad and a lower face;

and the suspension system further comprises a retaining member which is a piece separate from the leaf spring, the retaining member being secured to and under the leaf spring rear end portion by a fixing element located rearward of the pad, the retaining member including a front wall arranged forward of the fastener, and configured to abut against the fastener in order to prevent a rearward movement of the leaf spring relative to the rear attachment device above a predetermined limit.

Thus, in normal conditions, the leaf spring can be secured to the vehicle frame at its front end portion and can slide longitudinally relative to the vehicle frame at its rear end portion, in order to accommodate the axle vertical movements, with the pad sliding on the upper face of the leaf spring rear end portion. Owing to the substantially flat upper face of the leaf spring rear end portion, the contact with the pad, or any other appropriate member of the rear attachment device, is increased and improved.

Furthermore, in case the leaf spring breaks forward of the axle, the leaf spring—and therefore the axle—remains at least partially maintained in the longitudinal direction, insofar as the front wall forms a stop cooperating with the fastener, to prevent or limit the rearward movement of the leaf spring relative to the rear attachment device.

In other words, the axle is prevented from moving rearward above a predetermined limit. This ensures the driver can at least stop the vehicle safely. This advantage is obtained with an arrangement which is simple to manufacture and implement, the invention therefore providing a cost effective solution.

Furthermore, as the fixing element is located rearward of the pad, it does not interfere with the contact area between the pad and the leaf spring rear end portion. Thus, the fixing element does not impede the longitudinal sliding of the leaf spring, nor does it weaken or damage the leaf spring rear end portion.

The invention is particularly favourable for a suspension system which comprises a single leaf spring, i.e. no back-up leaf for ensuring the system safety.

The retaining member may comprise a rear portion which is flat and which is secured under and against the leaf spring rear end portion.

The front wall of the retaining member can be curved around a transverse axis located rearward of said front wall. Therefore, the front wall forms a hook capable of efficiently cooperating with the fastener.

According to an embodiment, the retaining member forms an open hook extending over an angle ($\alpha$) of at least 90°, preferably at least 130°, for example around 180°, forward of the fastener.

According to another embodiment, the retaining member forms a closed loop in which the fastener is received. The retaining member may have a main portion forming said closed loop, from which closed loop extend two rear end portions that are substantially flat, parallel and adjacent, and that are secured together under and against the leaf spring rear end portion by means of said fixing element.

The fixing element can be a screw, a bolt or a rivet.

In an embodiment, the suspension system can comprise a front attachment device configured to be secured to the vehicle frame and an intermediate attachment device, the leaf spring comprising a front end portion, preferably loop-shaped, which is engaged in said front attachment device and an intermediate portion engaged in said intermediate attachment device for attaching the vehicle axle to the vehicle frame.

According to a second aspect, the invention concerns a vehicle comprising a frame, an axle, and a suspension system as previously described.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
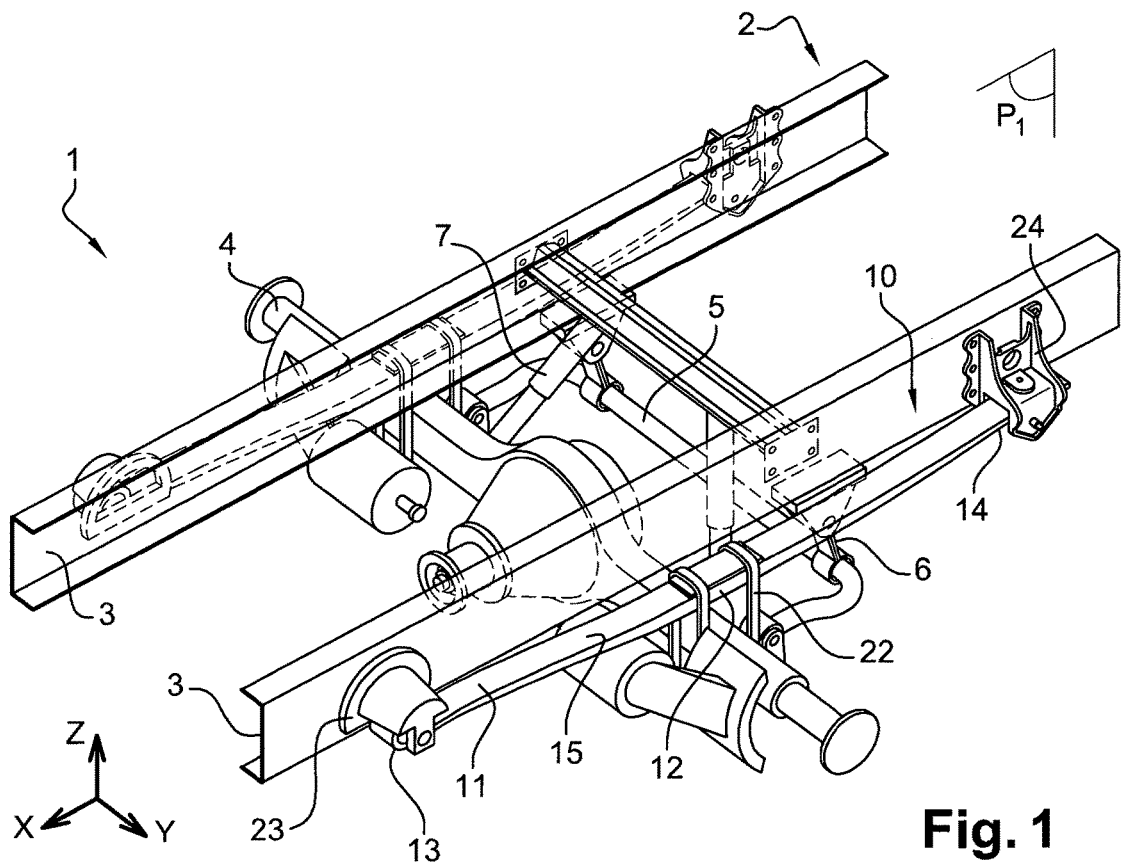
FIG. 1 is a partial perspective view of a vehicle, showing a frame, an axle, and a suspension system of the axle.
Figure 2:
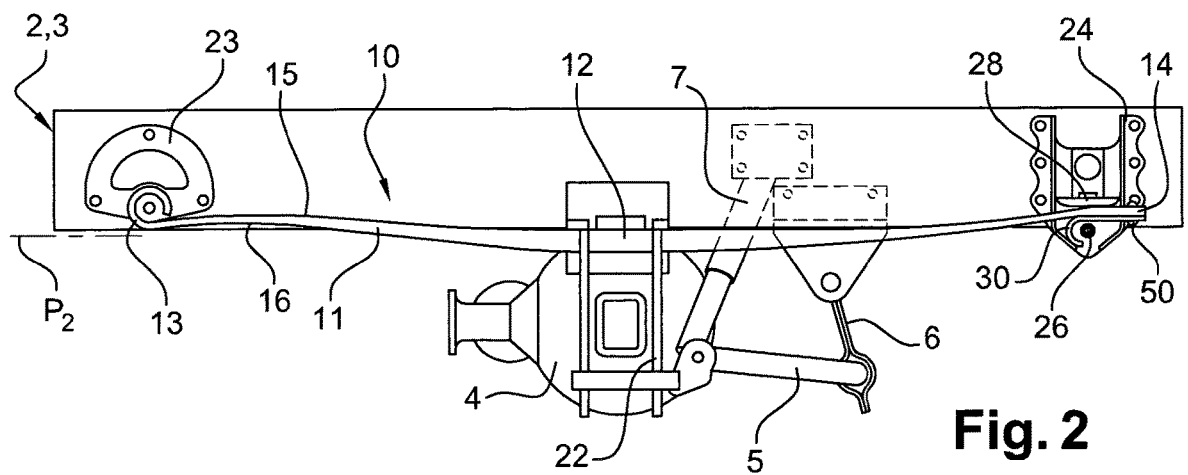
FIG. 2 is a side view of FIG. 1.

FIG. 1 is a partial view of a vehicle 1 comprising a frame 2 including two girders 3, and an axle 4 mounted on the frame 2.

The longitudinal direction X is defined as the longitudinal direction of the vehicle 1 and of the girders 3. The transverse direction Y is the direction of the axle 4, and Z is the vertical direction.

The mounting assembly between the axle 4 and the frame includes a stabilizer bar 5 secured to the frame 2 by means of stabilizer rods 6, at least one cylinder 7, and a suspension system 10 which will now be described.

The suspension system 10 being substantially symmetrical with respect to the vehicle median longitudinal plane P1, only one side of the suspension system 10 will be described.

The suspension system 10 comprises a leaf spring 11 which is preferably a single leaf spring. The leaf spring 11 extends longitudinally along the outer face of the corresponding girder 3, near the lower edge of said girder 3. The leaf spring 11, which can typically be made of metal such as steel, is a substantially flat piece lying in a plane P2, along its entire length except possibly at its front end portion. The leaf spring 11 has a substantially horizontal upper face 15 and a substantially horizontal lower surface 16 (when the vehicle is on a horizontal ground). The width of the leaf spring 11 can be substantially identical over the whole length.

The leaf spring 11 comprises an intermediate portion 12 engaged in an intermediate attachment device 22 which supports the axle 4. The leaf spring 11 also comprises a front end portion 13 engaged in a front attachment device 23 and a rear end portion 14 engaged in a rear attachment device 24, the front and rear attachment devices 23, 24 being secured to the vehicle frame 2, for example on the outer surface of the corresponding girder 3.

Figure 3:
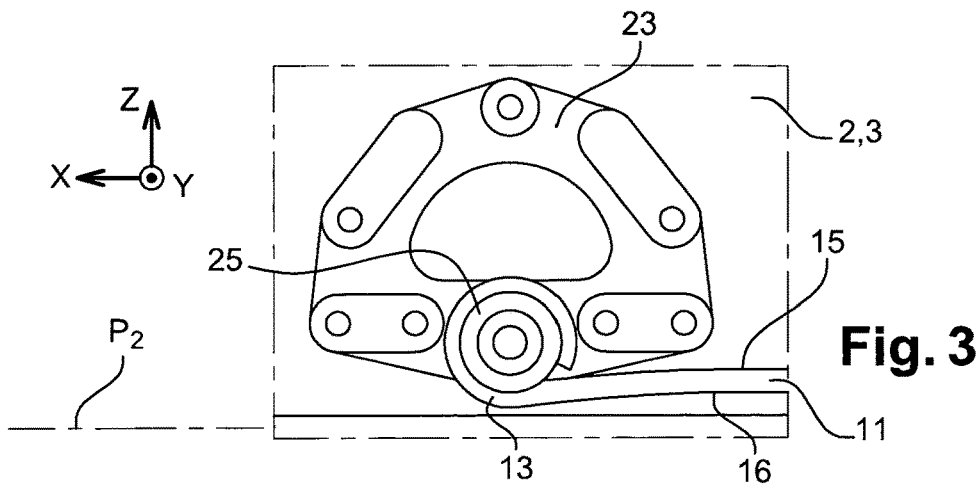
FIG. 3 is an enlarged side view of the front end portion of the suspension system of FIG. 1.

As can be seen on FIG. 3, the front end portion 13 can have the shape of a loop rolled around a transverse axis can be arranged around a bushing 25 connected to the front attachment device 23. With such an arrangement, the front end portion 13 of the leaf spring 11 cannot move longitudinally relative to the front attachment device 23, i.e. relative to the frame 2. The front end portion 13 is rolled above the leaf spring 11 and can be located above the plane P2. It is underlined that, in FIG. 3, only the part of the front attachment device 23 fastened to the frame 2 is illustrated, to show the front end portion 13 of the leaf spring 11. However, as can be seen on FIG. 1, the front attachment device 23 also comprises an outer part to form a housing for the leaf spring front end portion 13.

On the contrary, the suspension system 10 is configured so that the leaf spring rear end portion 14 can slide longitudinally relative to the rear attachment device 24, in the forward direction, in order to accommodate the vertical movements of the axle 4.

The rear attachment device 24 comprises a fastener 26, preferably equipped with a bushing 27, which extends substantially transversally. Furthermore, a pad 28 is secured on the rear attachment device 24, above the fastener 26, and is in contact with the upper face 15 of the leaf spring rear end portion 14. This upper face 15 can be substantially flat, therefore increasing and improving the contact with the pad 28, or any other appropriate member of the rear attachment device 24.

Figure 4:
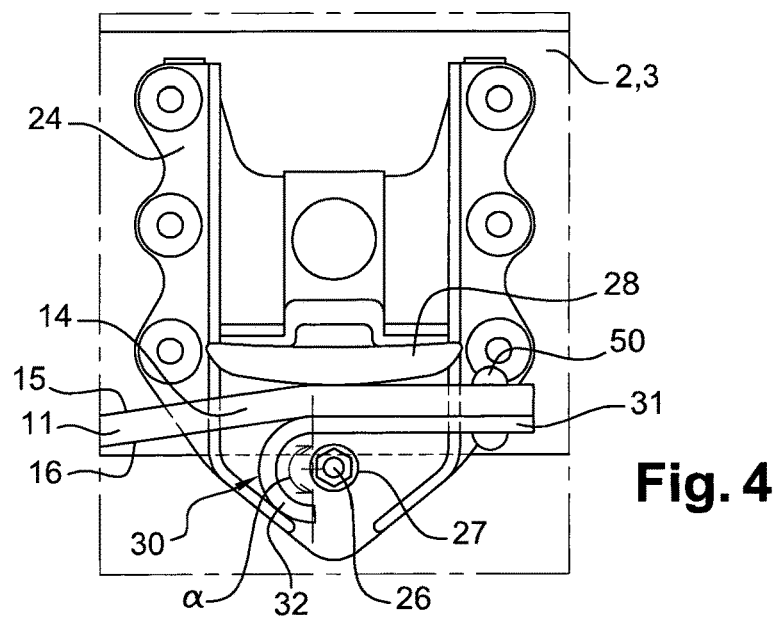
FIGS. 4 and 5 are schematic enlarged side views of the rear end portion of the suspension system of FIG. 1, according to two embodiments.
Figure 5:
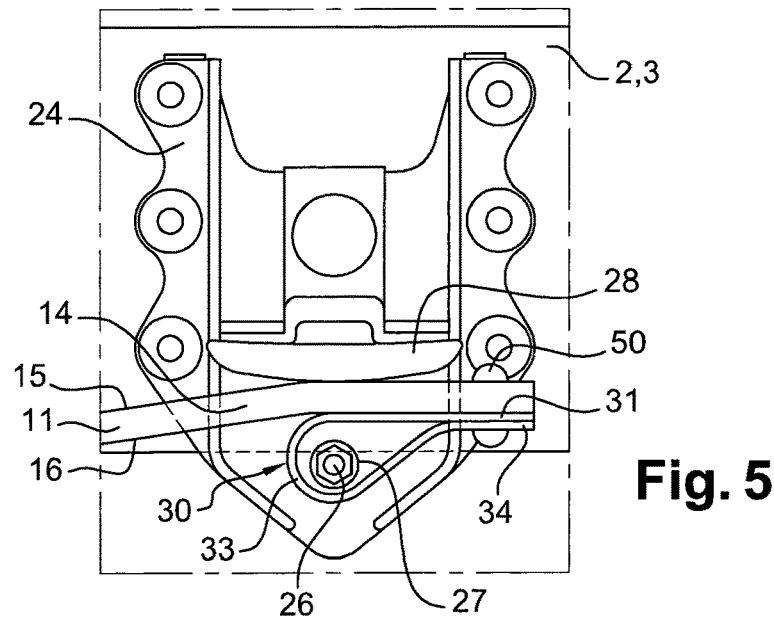

It has to be noted that, in FIGS. 4 and 5, only the part of the rear attachment device 24 fastened to the frame 2 is illustrated, to show the rear end portion 14 of the leaf spring 11. However, as can be seen on FIG. 1, the rear attachment device 24 also comprises an outer part to form a housing for the leaf spring rear end portion 14.

In FIG. 4, the leaf spring 11 forms an angle near the pad 28. This angle is not in practice as sharp as shown in FIG. 4 and is not necessarily near the pad, it could be longitudinally forward to the pad. This angle results in the height difference between the vehicle frame and the vehicle axle. Each type of vehicle has its specifications in terms of frame height, suspension height, axle height, but for each vehicle the leaf spring 11 has to get in contact with the pad 28 whatever the height difference between the vehicle frame and the vehicle axle is.

In normal use, thanks to the vehicle's total load, the rear end portion 14 of the leaf spring 11 remains in contact with the pad 28. Indeed, the action between the force exerted by the load applied vertically downwards from the top of the frame 2 and the force exerted from the ground via the wheels enables a permanent contact between the leaf spring 11 and the pad 28.

In very particular cases e.g. holes on the road, or when the vehicle frame is raised e.g. using a hanging bridge for maintenance purpose, there is a moment in time during which there is no force exerted from the ground and the action is therefore lost.

In these particular cases, the movement being essentially vertical, the fastener 26 ensures that the rear end portion 14 of the leaf spring 11 is maintained in the rear attachment device 24.

The suspension system 10 further comprises a retaining member 30 configured to prevent a rearward movement of the leaf spring 11 relative to the rear attachment device 24, or to prevent said movement above a predetermined limit.

The retaining member 30 is a piece separate from the leaf spring 11, which can typically be made from a folded or rolled sheet of metal, and which is secured to and under the leaf spring rear end portion 14. In practice, the retaining member 30 comprises a rear portion 31 which is flat and which is secured under and against the leaf spring rear end portion 14. The shape of the retaining member rear portion 31 thus follows the shape of the leaf spring rear end portion 14.

The retaining member 30 is secured to the leaf spring rear end portion 14 by a fixing element 50 which can be a screw, a bolt, a rivet or the like, and which is located rearward of the pad 28. The fixing element 50 is arranged not to contact the pad 28, whatever the position of the leaf spring 11 relative to the pad 28 (in normal operative conditions).

According to a first embodiment, illustrated in FIG. 4, the retaining member 30 forms an open hook which has a front wall 32 curved around a transverse axis located rearward of said front wall 32, and therefore open rearward. In the embodiment shown in FIG. 4, the front wall 32 substantially forms a half circle, i.e. extends over an angle α of around 180°, forward of the fastener 26. However, other implementations could be envisaged, provided the front wall 32 forms a stop for the fastener 26.

According to a second embodiment, illustrated in FIG. 5, the retaining member 30 forms a closed loop which is curved around a transverse axis, and in which the fastener 26 is received. The loop is oblong; more specifically, its length—along direction X—is greater than its height—along direction Z. As shown, the retaining member 30 has a main portion 33 forming said closed loop. Moreover, from this closed loop extend the above mentioned rear portion 31 and a further rear portion 34. These rear portions 31, 34 are substantially flat, parallel and adjacent, and are secured together under and against the leaf spring rear end portion 14 by means of the fixing element 50.

In both embodiments, the leaf spring rear end portion 14 can move longitudinally relative to the rear attachment device 24, in the forward direction and preferably also in the rearward direction, with the fastener 26 moving inside the hook or loop of the retaining member 30 and the leaf spring upper face 15 sliding against the pad 28.

The invention ensures the vehicle safely, especially in case the leaf spring 11 is broken at its front portion and therefore is no more maintained longitudinally in the front attachment device 23. Indeed, owing to the retaining member 30, the longitudinal movement of the leaf spring 11 relative to the rear attachment device 24 is limited, as it is prevented below a predetermined limit. More specifically, the retaining member front wall 32 or front portion of the loop 33, being arranged forward of the fastener 26, is configured to abut against the fastener 26 in case the leaf spring 11 is moved rearwards above a predetermined limit.

Another advantage of the invention is that the retaining member 30, having an oblong open or closed shape, provides a longitudinal degree of freedom for the leaf spring 11, while not creating a piece that significantly protrudes below the vehicle frame 2.

Besides, the above described second embodiment further enables preventing the axle 4 from moving forward—above a predetermined limit—which allows the driver to move the vehicle 1 along some distance, typically to park it safely on the side of the road. Another advantage of the second embodiment is that the retaining member 30, forming a closed loop and not only a hook, can be made of a less rigid piece of metal.

It is to be understood that the present invention is not limited to the embodiments described above and illustrated in the drawings; rather, the skilled person will recognize that many changes and modifications may be made within the scope of the appended claims.

The invention claimed is:

1. A suspension system of a vehicle axle, comprising a leaf spring having a longitudinal axis and a transverse axis, the suspension system comprising a rear attachment device which is configured to be secured to a vehicle frame and which receives a rear end portion of the leaf spring so as to allow said leaf spring rear end portion to slide longitudinally relative to the rear attachment device, characterized in that:
the rear attachment device comprises a fastener extending substantially transversally and a pad secured on the rear attachment device above the fastener;
the leaf spring rear end portion is substantially flat and has an upper face in contact with the pad and a lower face;
and the suspension system further comprises a retaining member which is a piece separate from the leaf spring, the retaining member being secured to and under the leaf spring rear end portion by a fixing element located rearward of the pad, the retaining member including a front wall arranged forward of the fastener, and configured to abut against the fastener in order to prevent a rearward movement of the leaf spring relative to the rear attachment device above a predetermined limit.

2. The suspension system according to claim 1, characterized in that it comprises a single leaf spring.

3. The suspension system according to claim 1, characterized in that the retaining member comprises a rear portion which is flat and which is secured under and against the leaf spring rear end portion.

4. The suspension system according to claim 1, characterized in that the front wall of the retaining member is curved around a transverse axis located rearward of said front wall.

5. The suspension system according to claim 1, characterized in that the retaining member forms an open hook extending over an angle of at least 90°, preferably at least 130°, forward of the fastener.

6. The suspension system according to claim 1, characterized in that the retaining member forms a closed loop in which the fastener is received.

7. The suspension system according to claim 6, characterized in that the retaining member has a main portion forming said closed loop, from which closed loop extend two rear end portions that are substantially flat, parallel and adjacent, and that are secured together under and against the leaf spring rear end portion by means of said fixing element.

8. The suspension system according to claim 1, characterized in that the fixing element is a screw, a bolt or a rivet.

9. The suspension system according to claim 1, characterized in that it further comprises a front attachment device configured to be secured to the vehicle frame and an intermediate attachment device, the leaf spring comprising a front end portion, preferably loop-shaped, which is engaged in said front attachment device and an intermediate portion engaged in said intermediate attachment device for attaching the vehicle axle to the vehicle frame.

\* \* \* \* \*